Sept. 21, 1954  J. W. KENDALL ET AL  2,689,629
REDUCTION OF THE MOMENTUM OF FALLING BODIES
Filed July 13, 1948
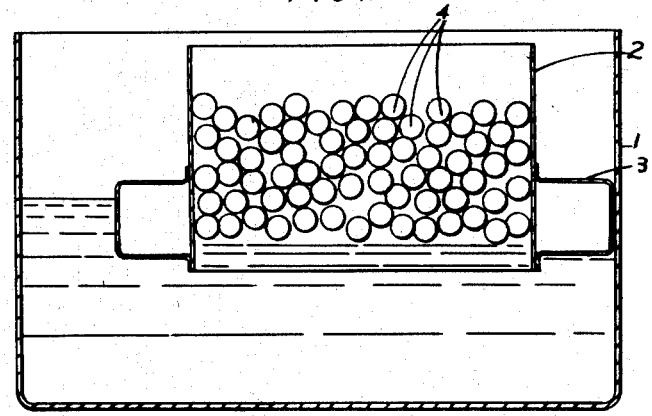
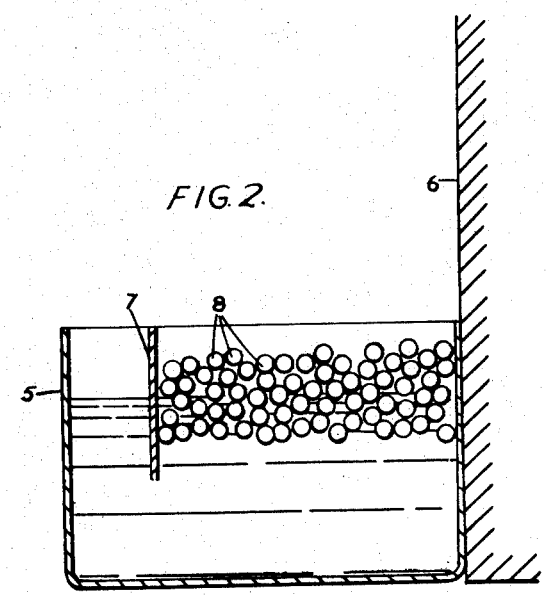
Inventors
J. W. Kendall
I. H. Morrison
By
Attorneys

UNITED STATES PATENT OFFICE 2,689,629

REDUCTION OF THE MOMENTUM OF FALLING BODIES

James William Kendall, Risley, and Ian Hugh Morrison, Sutton Coldfield, England

Application July 13, 1948, Serial No. 38,434

5 Claims. (Cl. 188—1)

This invention relates to cushions and to cushioning methods for reducing the momentum of falling articles and thereby breaking their fall.

It is applicable for example to the catching of worked metal articles leaving automatic and other machine tools, to conveyor systems for canned and other products and to the catching of sheathed uranium rods and other elements ejected from the discharge face of an atomic energy pile.

An object of the invention is to provide a simple and improved cushion for retarding or bringing to rest without damage articles of such density, surface material or shape that they would tend to be damaged in the absence of a shock absorber.

The cushion of the invention comprises a number of buoyant balls or other discrete bodies of rubber or other yielding or relatively soft material floating in several layers upon water or other liquid. The container for the liquid has walls sufficiently high to limit the dispersion of the balls under all operating conditions or barriers may be provided in the liquid container for limiting the dispersion of the balls. In one arrangement we provide as a container for the balls an open-ended metal cylinder with an air-belt around it so that it floats with its axis vertical on the surface of water in a tank.

The invention also comprises a method of conveying an article from a machine or structure wherein the article is discharged to fall on to a quantity of discrete buoyant bodies floating in several layers upon water or other liquid.

The size and mass and number of layers of the buoyant bodies are chosen according to the size and momentum of the bodies falling upon them. Tennis balls or similar air-filled rubber balls, sponge rubber balls or wooden balls or blocks may be used. Air-filled Celluloid balls, such as used for table tennis, may be used in some cases for light-weight articles, but in most applications of the invention a greater mutual coefficient of friction is desirable than that between Celluloid or polished surfaces, to reduce the slipping of the balls over each other and out of the path of the falling article.

Among the problems which arise in the cushioning of falling bodies are those arising from wearing and aging of the cushion. It is important in many applications that no failure shall occur due to a fault or a weakness developing in the cushion. Where yielding fibrous or cellular shock-absorbing mats of large bulk are used, their regular replacement is costly and may call for special tools or mechanism. This is more especially the case in radio active systems where the cushion may not be handled. In the cushioning arrangement of the invention, the buoyant bodies can be readily replaced. In the case of air-filled rubber balls, each ball remains serviceable so long as it floats, and a ball which becomes so damaged that it fills with water and sinks, is in sinking withdrawn from operation as part of the cushion. Thus faulty elements of the cushion are automatically eliminated and individually replaceable.

In the application of the invention to the cushioning of sheathed uranium rods discharged from the vertical face of an atomic energy pile, and where the rods are of the order of one foot in length, one inch in diameter and five or six pounds in weight with a thin sheet aluminium sheath and are to drop from varying heights up to twenty or thirty feet into a water tank, we find that about five layers of tennis-balls (preferably without the usual outer skins) floating in the tank provide a useful cushioning effect. Under static conditions it was found that three layers of such balls were just able to support the weight of one uranium rod.

When the rods are dropped upon the cushion, they pass rapidly through the first layers and the chance of impact between two rods at the cushion surface is diminished. The rods lose most of their momentum in traversing the layers of balls and drop to the bottom of the tank without serious damage to the thin aluminium sheaths. A mattress of wire mesh in tension or of fibrous, rubber or other yielding material may be arranged in the water and extending over the floor of the tank to absorb the remnant of the momentum of the articles after they have traversed the layers.

The water tank may have a vertical partition across it, dipping into the water, the balls being arranged on one side of the partition. Then rods which have fallen through the layers of balls to the bottom of the tank may be removed by a rake or grab or other means on the other side of the partition.

Arrangements embodying the invention are shown by way of example in the accompanying drawings, the two figures of which are cross-sectional views of different structures.

The structure of Figure 1 comprises a water-tank 1 in which floats an open-ended metal cylinder 2 rendered buoyant by means of an air-filled annular metal box 3 encircling it. The cylinder is charged with air-filled rubber balls 4 which float on the water in about five layers and serve to break the fall of articles dropped into the cylinder.

The structure of Figure 2 comprises a metal trough 5 extending along the foot of the discharge face 6 of a uranium pile. A vertical metal partition 7 extends the length of the trough, its lower edge lying clear of the bottom of the trough. The trough is partly filled with water and air-filled rubber balls 8 are floated in several layers on the water on the side of the partition adjacent to the pile discharge face 6.

Aluminium sheathed uranium rods discharged from the pile-face fall through the air-filled balls into the bottom of the trough whence they may be removed by means such as a rake or grab mechanically operated from the other side of the partition.

We claim:

1. A cushion for falling metal articles comprising a container positioned to catch falling articles, liquid in said container and a plurality of relatively soft buoyant bodies floating in several layers in said liquid.

2. A cushion according to claim 1 including a float having a wall enclosing a portion of the surface of said liquid for limiting the dispersal of said bodies.

3. A cushion according to claim 1 including a vertical partition in said tank extending only part way to the bottom thereof to define a confining area for said bodies on one side of said partition, and to define on the other side of said partition an area free of said bodies for use in extracting fallen articles located in said tank below said buoyant bodies.

4. A cushion for falling articles comprising a tank, water at least partly filling said tank, and a plurality of gas-filled rubber balls floating in several layers in said tank.

5. Apparatus comprising a mass having a vertical discharge face for metallic bodies contained in said mass, a trough at the foot of said discharge face for receiving the discharged bodies, liquid in said trough, and a plurality of buoyant bodies floating in several layers in the liquid in said trough for breakng the fall of the discharged bodies.

References Cited in the file of this patent

UNITED STATES PATENTS

| Number | Name | Date |
|---|---|---|
| 1,531,440 | Hoyt | Mar. 31, 1925 |
| 1,828,694 | Winkler | Oct. 20, 1931 |